(12) United States Patent
Tadano et al.

(10) Patent No.: US 8,957,618 B2
(45) Date of Patent: Feb. 17, 2015

(54) CONTROL DEVICE FOR ELECTRIC VEHICLE

(75) Inventors: Yui Tadano, Wako (JP); Koji Aoki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 13/354,693

(22) Filed: Jan. 20, 2012

(65) Prior Publication Data
US 2012/0187881 A1 Jul. 26, 2012

(30) Foreign Application Priority Data
Jan. 24, 2011 (JP) .................. 2011-011839

(51) Int. Cl.
*H02P 7/00* (2006.01)
*B60L 15/20* (2006.01)
*B60L 11/18* (2006.01)
*B62J 99/00* (2009.01)
*B60L 15/00* (2006.01)
*B60W 10/08* (2006.01)
*B62J 1/12* (2006.01)
*B62K 23/02* (2006.01)

(52) U.S. Cl.
CPC ......... *B60L 15/2063* (2013.01); *B60L 11/1818* (2013.01); *B60L 11/1874* (2013.01); *B60L 11/1879* (2013.01); *B62J 99/00* (2013.01); B60L 2200/12 (2013.01); B60L 2210/10 (2013.01); B60L 2240/12 (2013.01); B60L 2240/421 (2013.01); B60L 2240/642 (2013.01); Y02T 10/642 (2013.01); Y02T 10/7088 (2013.01); Y02T 10/7005 (2013.01); Y02T 10/705 (2013.01); Y02T 90/16 (2013.01); Y02T 10/7216 (2013.01); Y02T 90/121 (2013.01); Y02T 90/14 (2013.01); Y02T 90/127 (2013.01)

USPC .......... 318/446; 180/333; 180/220; 180/170; 180/219; 180/165

(58) Field of Classification Search
USPC ........ 180/333, 19.3, 220, 271–273, 170, 171, 180/219, 65.1–65.7, 165
See application file for complete search history.

(56) References Cited

U.S. PATENT DOCUMENTS

| 5,730,243 | A | * | 3/1998 | Koike et al. ................... 180/220 |
| 6,581,714 | B1 | * | 6/2003 | Kamen et al. ................. 180/333 |
| 6,724,165 | B2 | * | 4/2004 | Hughes .......................... 318/376 |
| 7,762,231 | B2 | * | 7/2010 | Dugas et al. ................... 123/399 |
| 2008/0114523 | A1 | * | 5/2008 | Dugas et al. ................... 701/101 |
| 2010/0025124 | A1 | * | 2/2010 | Arpino .......................... 180/19.3 |
| 2012/0203407 | A1 | * | 8/2012 | Hatanaka et al. ............... 701/22 |
| 2013/0045648 | A1 | * | 2/2013 | Kinpara et al. .................... 440/6 |
| 2013/0153323 | A1 | * | 6/2013 | Tsukamoto et al. .......... 180/220 |

* cited by examiner

FOREIGN PATENT DOCUMENTS

JP 2010-120597 6/2010

Primary Examiner — Eduardo Colon Santana
Assistant Examiner — Said Bouziane
(74) Attorney, Agent, or Firm — Squire Patton Boggs (US) LLP

(57) ABSTRACT

In an electric vehicle, a throttle spring restores a throttle opening on the side of a minimum opening when the accelerator is not operated. A driving section drives a motor according to the throttle opening. The throttle spring pushes an accelerator grip to a creep speed reference opening so as to reduce the throttle opening. A creep speed control section supplies a motor driving instruction to the driving section so that the electric vehicle is advanced at minute vehicle speed. The electric vehicle can also be backed at predetermined minute vehicle speed when the throttle opening is smaller than the creep speed reference opening.

16 Claims, 8 Drawing Sheets

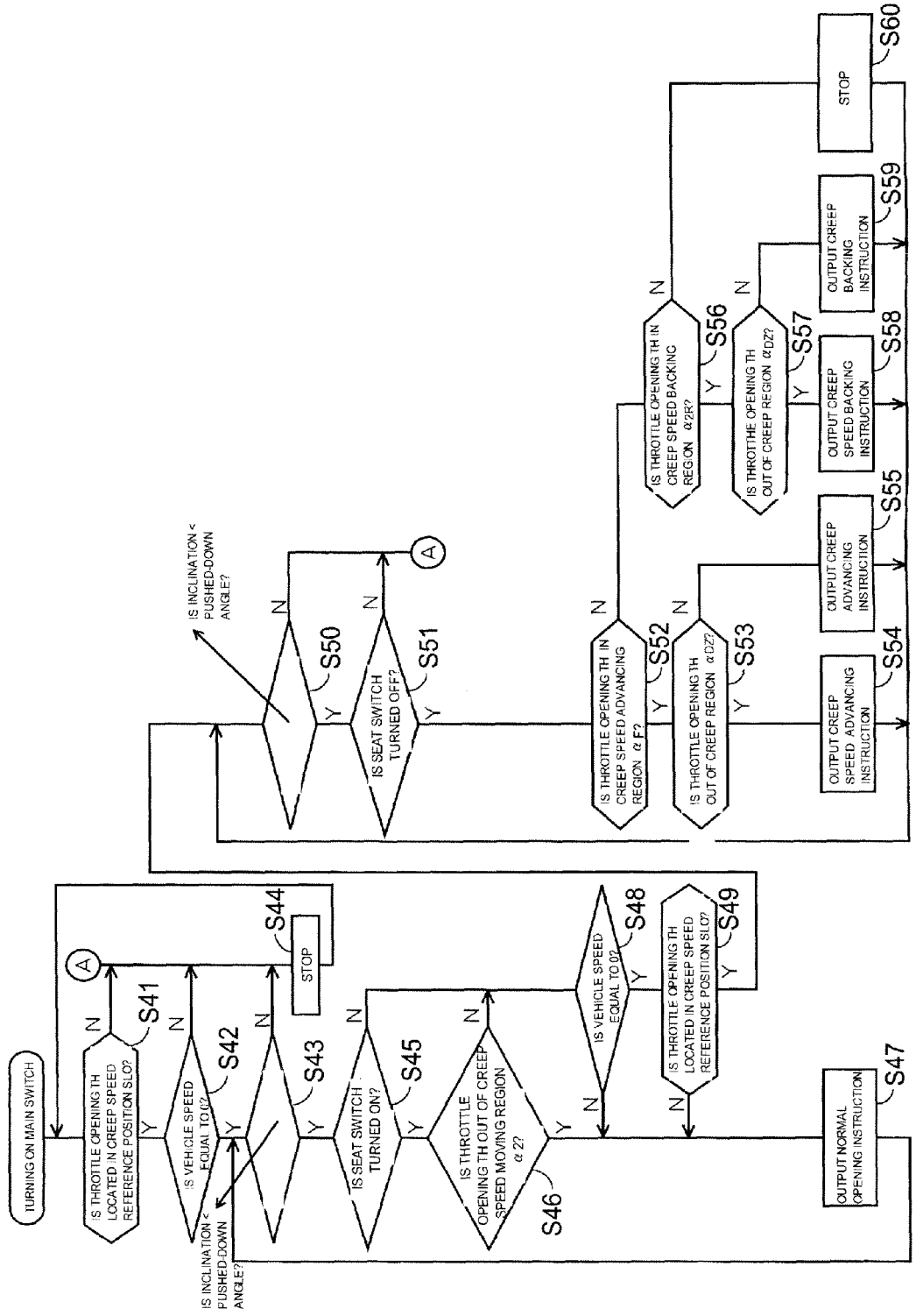

CONTROL DEVICE FOR ELECTRIC VEHICLE

BACKGROUND

1. Field:

The present invention relates to a control device for an electric vehicle, particularly relates to a control device for an electric vehicle that enables an advance and backing of the vehicle.

2. Description of the Related Art

In Japanese Patent Publication JP-A No. 2010-120597 (patent literature 1), a vehicle that can be advanced or reversed (backed) is disclosed. In the conventional type vehicle, a single backing switch is provided with a function as a mode setting switch for setting a backing mode and a function for turning a motor which is a driving source of the vehicle in a reverse direction (that is, in a backing direction of the vehicle). When the backing mode is set by pressing and holding the backing switch, the backing switch is operated and the vehicle can be backed, and the vehicle can be advanced by operating an accelerator grip. Besides, in patent literature 1, a configuration that an exclusive switch for setting the backing mode is provided separately from the backing switch is also disclosed.

The vehicle disclosed in the patent literature 1 is proposed to reduce or eliminate difficulty in operation when an advance and backing are required to be repeatedly switched as in parking, however, multiple switches still require operation in backing and there is room to further reduce the difficulty of the operation.

SUMMARY

An object of the prevent invention is, in certain embodiments, to provide a control device for an electric vehicle for enabling reducing or simplifying the operation of a switch in backing and enabling improved efficiency in the operation.

To achieve the object, embodiments of the present invention are based upon a control device for an electric vehicle (for example, a saddle-ride type electric vehicle) provided with an accelerator mechanism equipped with an accelerator grip. The grip enables the operation of an accelerator for increasing a throttle opening in a first direction from a minimum opening in a normal moving region and spring means that restores the throttle opening on the side of the minimum opening when the accelerator is not operated. A driving section is provided, that drives a motor according to the throttle opening by the accelerator mechanism. The driving section has a first characteristic that there is provided a creep speed moving region further set in a second direction reverse to the first direction from the minimum opening. Position regulating means are located between the normal moving region and the creep speed moving region. The accelerator mechanism is configured to enable operating the throttle opening from the minimum opening to the creep speed moving region further set in the second direction reverse to the first direction against the position regulating means. The spring means is set to push the accelerator grip up to a creep speed reference opening located in the middle of the creep speed moving region so as to reduce the throttle opening. There is provided a creep speed control section that supplies a motor driving instruction to the driving section so that in the creep speed moving region, the electric vehicle is advanced at predetermined minute vehicle speed in the region in which the throttle opening is larger with the creep speed reference opening as a criterion. In the meantime, the electric vehicle is backed at predetermined minute vehicle speed in the region in which the throttle opening is smaller with the creep speed reference opening as the criterion.

The present invention has a second characteristic that the creep speed control section supplies a motor driving instruction set to increase the vehicle speed of an advance and backing as the deviation of the throttle opening from the creep speed reference opening increases to the driver.

The present invention has a third characteristic that the creep speed control section is provided with a creep control part that makes the electric vehicle advance or back at creep speed which is lower than the predetermined minute vehicle speed when the throttle opening is located in a creep region.

The present invention has a fourth characteristic that the creep speed control section is configured to make the electric vehicle advance or back at predetermined creep vehicle speed when the electric vehicle is stopped.

The present invention has a fifth characteristic that the creep speed control section is configured to make the electric vehicle advance or back at the predetermined creep vehicle speed when the throttle opening is held at the creep speed reference opening for at least a predetermined time.

The present invention has a sixth characteristic that there is provided release means that releases regulation by the position regulating means according to the operation of the accelerator when the throttle opening is varied across the position regulating means by the operation of the accelerator.

The present invention has a seventh characteristic that the position regulating means can be composed of a stopper provided on the side of the accelerator grip and a locking part abutting on the stopper in a direction in which the throttle opening is smaller. Furthermore, the release means can include locking avoiding means that moves the stopper to avoid abutment of the stopper on the locking part.

The present invention has an eighth characteristic that mutual abutting faces are configured, when the accelerator is operated in a direction in which the throttle opening is larger out of outside faces of the stopper and the locking part are inclined, so that they abut via a predetermined clearance angle.

The present invention has a ninth characteristic that the creep speed control section is configured to make the electric vehicle advance or back at the predetermined creep vehicle speed when it is judged, based upon the inclination of the electric vehicle, that a falling or unintended rolling of the electric vehicle is not detected.

The present invention has a tenth characteristic that the creep speed control section is configured to make the electric vehicle advance or back at the predetermined creep vehicle speed when a rider is not seated on a seat.

The present invention has an eleventh characteristic that the creep speed control section is configured to make the electric vehicle advance or back at a creep vehicle speed lower than the speed for walking while pushing the electric vehicle when speed at which a rider can walk. The electric vehicle is preset and vehicle speed is lower than the preset speed for walking while pushing the electric vehicle.

Further, the present invention has a twelfth characteristic that the creep speed control section is configured to supply the motor driving instruction to the driving section so as to stop the electric vehicle when speed at which a rider can walk while pushing the electric vehicle is preset and vehicle speed is higher than the preset speed of walking while pushing the electric vehicle.

According to the present invention having the first characteristic, the electric vehicle can be moved in a longitudinal direction at the minute speed by the motor with simple operation by turning the accelerator grip across the position regulating means from the normal moving region to the creep speed moving region, and operating the accelerator grip in the first direction and in the second direction with the creep speed reference opening in the center in the creep speed moving region. As the electric vehicle can be advanced and backed at the minute vehicle speed in the creep speed moving region, both walking pushing the electric vehicle and storing the electric vehicle in a garage that requires the repeated turning of a handlebar can be easily performed with only the operation of the accelerator handlebar.

According to the present invention having the second characteristic, the vehicle speed can be varied in the creep speed moving region according to the manipulated variable of the accelerator grip.

According to the present invention having the third characteristic, the electric vehicle can be advanced or backed at the creep speed lower than the predetermined minute vehicle speed in the creep region.

According to the present invention having the fourth characteristic, when the accelerator grip is operated up to the creep speed moving region under a prerequisite that the electric vehicle is stopped, the electric vehicle can be advanced or backed at the predetermined creep vehicle speed.

According to the present invention having the fifth characteristic, as the electric vehicle can be advanced or backed at the predetermined creep vehicle speed when the throttle opening is held at the creep speed reference opening for the predetermined time or longer, creep speed control is not immediately made even if the accelerator grip is operated up to the creep speed moving region by wrong operation. Accordingly, the creep speed control can be started with the secure intention of a rider.

According to the present invention having the sixth characteristic, as the regulation by the position regulating means is released by the operation of the accelerator when the throttle opening is varied across the position regulating means, the electric vehicle can be driven at the minute vehicle speed under the secure intention of the rider.

According to the present invention having the seventh characteristic, as the position regulating means is released by operating the locking avoiding means, the electric vehicle can be driven at the minute vehicle speed under the secure intention of the rider.

According to the present invention having the eighth characteristic, when the accelerator is operated in the direction in which the throttle opening is larger from the creep speed moving region to the normal moving region, the accelerator can be operated to the normal moving region utilizing the inclination of the abutting faces without depending upon the locking avoiding means.

According to the present invention having the ninth characteristic, in the event that a rider's hand is put on the accelerator grip or the accelerator grip is gripped with the hand so as to raise the electric vehicle when the electric vehicle is pushed down, unnecessary creep speed control by the operation of the accelerator grip can be prevented from being made.

According to the present invention having the tenth characteristic, pushing the electric vehicle at a walking speed is enabled by making the electric vehicle advance or back at the predetermined creep vehicle speed when the rider is not seated on the seat.

According to the present invention having the eleventh characteristic, as the electric vehicle is advanced or backed at the creep vehicle speed lower than the normal speed of walking while pushing the electric vehicle when the vehicle speed is lower than the speed of walking while pushing the electric vehicle, creep speed control can be made in a region of speed at which the rider can operate the electric vehicle by limiting speed.

According to the present invention having the twelfth characteristic, as the electric vehicle is stopped when the vehicle speed is higher than the speed of walking while pushing the electric vehicle, the electric vehicle can be prevented from being moved at higher speed than the speed possible by a person walking while pushing the electric vehicle.

BRIEF DESCRIPTION OF DRAWINGS

FIG. 11 is a flowchart showing the operation of a control system in a transformed example.

DETAILED DESCRIPTION

Figure 2:
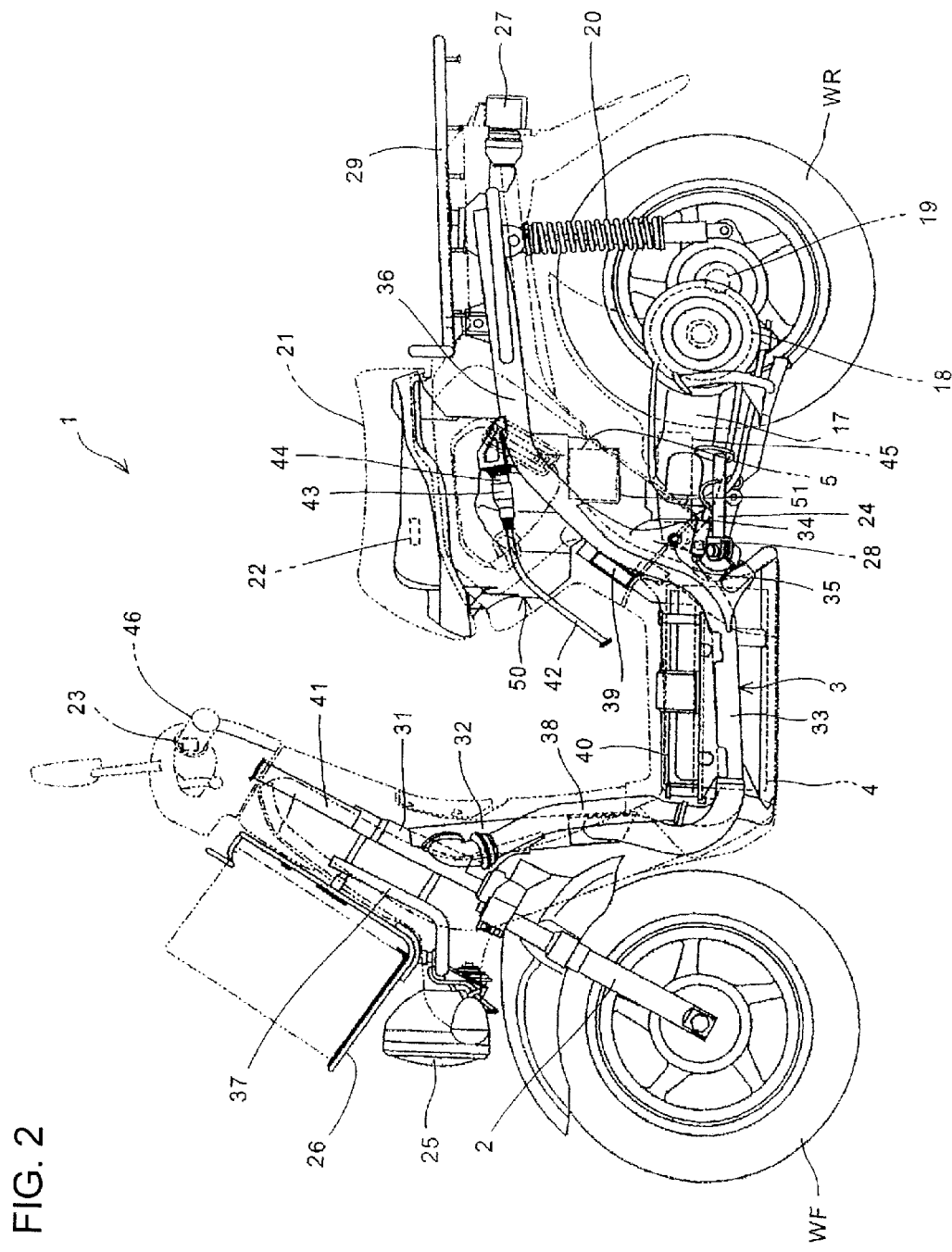
FIG. 2 is a left side view showing the electric vehicle suitable for applying a control device in one embodiment of the present invention.

Referring to the drawings, embodiments of the present invention will be described below. FIG. 2 is a left side view showing an electric vehicle provided with a control device related to one embodiment of the present invention. The electric vehicle 1 can be a scooter type motorcycle provided with a low deck floor, and each component is attached to a body frame 3 directly or indirectly via another member. The body frame 3 includes a head pipe 31, a front frame part 32 an end of which is joined to the head pipe 31 and a rear end of which is extended downward, a pair of main frame parts 33 branched laterally in a direction of vehicle width from the front frame part 32 and extended backward in a vehicle body and a rear frame part 36 extended upward and backward in the vehicle body from the main frame part 33.

A front fork 2 that supports a front wheel WF is steerably supported by the head pipe 31.

A steering handlebar 46 provided with an accelerator grip is coupled to an upper part of a steering shaft 41 extended upward from the front fork 2 and supported by the head pipe 31. A throttle sensor 23 that detects a turned angle of the accelerator grip, that is, an accelerator opening is provided to the steering handlebar 46.

A bracket 37 composed of a pipe is connected to the front of the head pipe 31, a headlight 25 is attached to a front end of the bracket 37, and a front carrier 26 supported by the bracket 37 is provided over the headlight 25.

A bracket 34 extended backward in the vehicle body is joined to an intermediate area of the main frame part 33 and the rear frame part 36 of the body frame 3, a pivot 35 extended in the direction of vehicle width is provided to the bracket 34, and a swing arm 17 is vertically swingably supported by the pivot 35. A motor 18 as a vehicle driving source is provided to the swing arm 17, the output of the motor 18 is transmitted to a rear axle 19, and the output drives a rear wheel WR supported by the rear axle 19. A housing including the rear axle 19 and the rear frame part 36 are coupled by a rear suspension 20. Besides, a vehicle speed sensor 30 that detects the number of revolutions of the motor 18 is provided to the swing arm 17.

A side stand 24 that supports the vehicle body in stopping is provided to the bracket 34 and the side stand 24 is provided with a side stand switch 28 that outputs a detection signal when the side stand 24 is stored in a predetermined position.

A high-voltage (for example, rated to 72 v) main battery 4 composed of plural battery cells is mounted on the main frame part 33 and an upper part of the main battery 4 is covered with a cover 40. An air introduction pipe 38 is coupled to the front of the main battery 4 and an intake fan 39 is provided to the rear of the main battery 4. Air is introduced in the main battery 4 from the air introduction pipe 38 by the intake fan 39 and the air is discharged backward in the vehicle body after the air cools the main battery 4. It is desirable that air is introduced in the air introduction pipe 38 through an air cleaner not shown.

A socket 44 to which a plug 43 of a charging cable 42 extended from a battery charger that charges the main battery 4 can be connected is provided on the rear frame part 36. A rear carrier 29 and a taillight 27 are further provided to the rear frame part 36.

A cargo room 50 is provided between the pair of right and left rear frame parts 36 and a low-voltage (for example, rated to 12 v) sub battery 5 charged by the main battery 4 is housed at a bottom 51 of the cargo room protruded downward from the cargo room 50. A power drive unit (PDU) 45 that controls the motor 18 is provided to the swing arm 17.

A rider's seat 21, that can also function as a lid of the cargo room 50, is provided on the upside of the cargo room 50 and a seat switch 22 that is operated when a rider is seated and outputs a seating signal is provided to the rider's seat 21. An inclination sensor that detects a tilt angle in a lateral direction of the electric vehicle 1 can be provided at the bottom of the cargo room 50.

Figure 3:
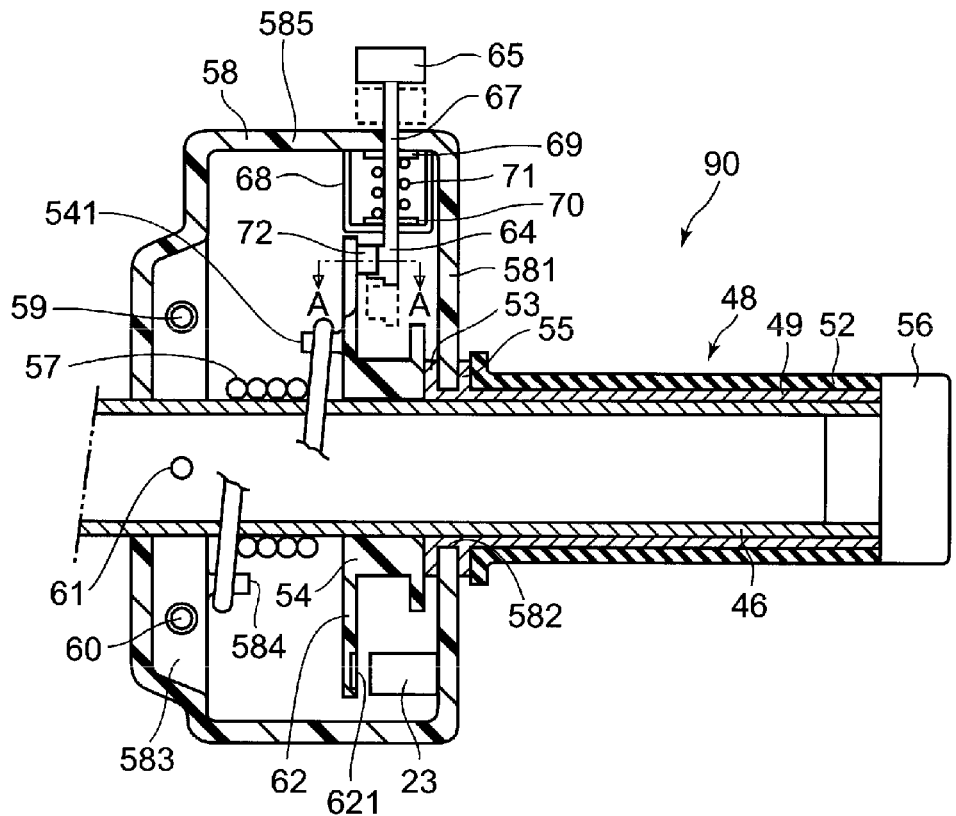
FIG. 3 is a sectional view showing a main part of a steering operation section showing an accelerator mechanism.

FIG. 3 is a sectional view showing a main part of a steering operation section showing an accelerator mechanism. As shown in FIG. 3, the accelerator mechanism 90 arranged at a right end of the steering handlebar 46 made of a pipe is provided with the accelerator grip 48 composed of a sleeve 49 fitted on an outside periphery of the steering handlebar 46 with play and a rubber grip cover 52 that further covers an outside periphery of the sleeve 49 and a throttle drum 54 connected to a flange 53 formed at a left end of the sleeve 49. Another flange 55 is formed on the further right side of the flange 53 on the sleeve 49. The sleeve 49 can be turned in a circumferential direction along a peripheral surface of the steering handlebar 46. The grip cover 52 is bonded or fitted to a peripheral surface of the sleeve 49. A cap 56 is fitted at the end of the steering handlebar 46.

Further, in the accelerator mechanism 90, a throttle spring 57 for pressing the accelerator grip 48 on the front side of the vehicle body, that is, on the side of a creep speed moving region α2 (see FIG. 1 and others) for the steering handlebar 46, is provided on the left side of the throttle drum 54 (in this embodiment, an example using a helical torsion spring is given). A switch case 58 is provided on the left side of the accelerator grip 48. The switch case 58 is composed of two parts divided in the circumferential direction of the steering handlebar 46 and is integrated using bolts 59, 60. In a right wall 581 of the switch case 58, a hole 582 an inside peripheral part of which is engaged with the two flanges 53, 55 of the sleeve 49 is formed and a motion of the sleeve 49 for the switch case 58 in an axial direction of the steering handlebar 46 is regulated by these engagement parts.

The switch case 58 can be provided with a hole (not shown) engaged with a pin 61 that pierces the steering handlebar 46 and a position in the circumference direction and in the axial direction of the steering handlebar 46 is specified by the engagement of the hole with the pin 61. A left end of the throttle spring 57 is locked to a boss 584 of a left sidewall 583 of the switch case 58 and a right end of the throttle spring 57 is locked to a boss 541 of the left side of the throttle drum 54.

The throttle drum 54 is provided with a flange 62 equipped with a detected part 621 on one face (on a face on the side of the sleeve 49) and the throttle sensor 23 composed of a non-contact sensor (such as a magnetic sensor) is arranged opposite to the detected part 621. The throttle sensor 23 is fixed to a right sidewall 581 of the switch case 58.

A release device 66 can be provided, and can include a stopper 64 that regulates the rotation of the throttle drum 54 on the front side in the vehicle body of a normal moving region α1 (see FIG. 1 and others), and a release button 65 for releasing regulation by the stopper 64 is attached to the switch case 58. A stem 67 extended from the stopper 64 of the release device 66 pierces a wall 585 of the switch case 58 and is protruded outside, and the release button 65 is connected to the protruded part. A spring case 68 that surrounds the stem 67 is provided inside the switch case 58 and is fixed to an inside face of the wall 585. A washer 69 is integrated with the stem 67 and a helical compression spring (hereinafter called a reset spring) 71 that presses the release button 65 in a direction for resetting to its initial position is arranged between the washer 69 and the other washer 70 provided at the bottom of the spring case 68. The washer 69 is pressed on the inside face of the wall 585 by the reset spring 71; a maximum protruded position (shown by a solid line in FIG. 3) of the release button 65 is specified.

An end of the stem 67 functions as the stopper 64. That is, the stopper 64 is engaged with a locking part 72 protruded on the side on which the detected part 621 is provided on the outside periphery of the flange 62 of the throttle drum 54, as described later.

A mechanism for a detent of the stem 67 for the switch case 58 is provided. A transverse section of the stem 67 is rectangular and at least one of a hole which the stem 67 pierces the wall 585 of the switch case 58 and a hole provided at the bottom of the spring case 68 is rectangular to fit to a shape of the transverse section of the stem 67. Hereby, the rotation in a circumferential direction of the stem 67 is regulated.

Figure 4:
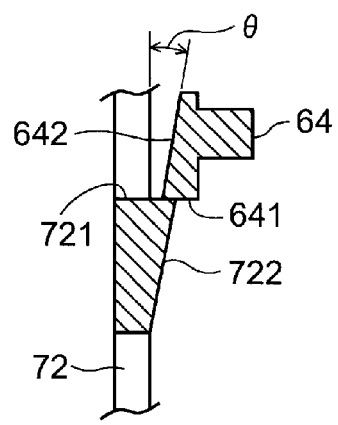
FIG. 4 is a sectional view viewed along a line A-A in FIG. 3.

FIG. 4 is a sectional view along a line A-A in FIG. 3 and shows engagement relation between the stopper 64 and the locking part 72. The locking part 72 and the stopper 64 are provided with locking faces 721, 641 respectively opposite in a direction of the front of the throttle drum 54, that is, in a direction pressed by the throttle spring 57. The locking part 72 and the stopper 64 can be provided with transition faces 642, 722 respectively having an inclination θ with a face 622 of the flange 62.

Further, a creep speed limit stopper 73 (see FIG. 5) on which the face 721 of the locking part 72 abuts and which specifies a limit in a front direction of the creep speed moving region α2 is provided to an inside peripheral face of the switch case 58. The rider can turn the accelerator grip 48 in a front direction up to a position in which the locking part 72 abuts on the creep speed limit stopper 73.

Figure 5:
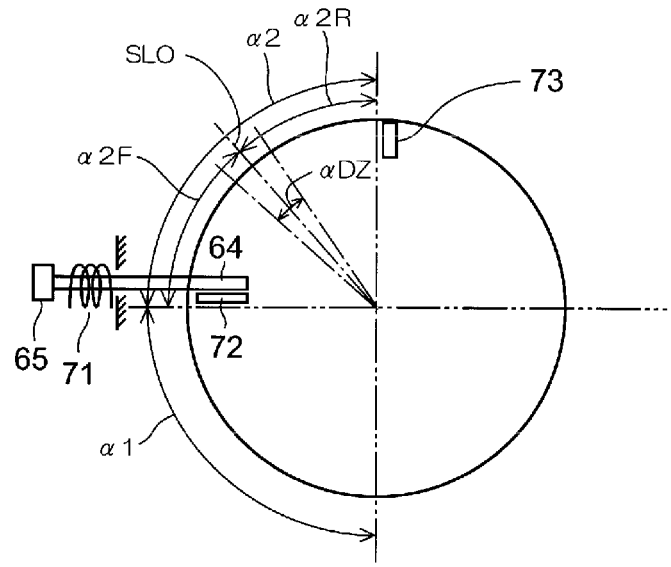
FIG. 5 is a schematic diagram when a throttle drum is viewed from the right side of the electric vehicle.

Referring to FIG. 5, the operation of the accelerator grip 48 and a motion of the electric vehicle 1 will be described below. FIG. 5 is a schematic diagram showing the throttle drum 54 viewed from the right side of the electric vehicle 1. The locking part 72 is provided to the throttle drum 54 turned with the accelerator grip 48, and the stopper 64 and the creep speed limit stopper 73 respectively engaged with the locking part 72 in predetermined positions are provided.

In the above-mentioned configuration, the rider can operate the accelerator grip 48 in the normal moving region α1 in normal operation in which the electric vehicle 1 is forward accelerated. When the locking part 72 abuts on the stopper 64, a further motion to the front side in the vehicle body of the throttle drum 54 is stopped and a position on the front side in the vehicle body of the normal moving region α1 is specified. Then, when the release button 65 is pressed, the stopper 64 is pressed downward (is moved in a central direction of the throttle drum 54), the engagement of the stopper 64 with the locking part 72 is released, and the regulation of the position on the front side in the vehicle body of the normal moving region α1 is released. When the regulation is released, the accelerator grip 48 is turned to the creep speed moving region α2 by the throttle spring 57. The throttle spring 57 presses the accelerator grip 48 up to a position (a creep speed reference opening SLO) in which the throttle spring 57 is balanced in the creep speed moving region α2. Hereinafter, a position of the accelerator grip 48 is called a "throttle opening TH".

In the creep speed moving region α2, the electric vehicle 1 can be advanced or backed at creep speed. That is, when the accelerator grip 48 is turned from the creep speed reference opening SLO to a creep speed backing region α2R on the front side in the vehicle body through a creep region αDZ, the motor 18 is driven so that the electric vehicle 1 is backed at creep speed (for example, at vehicle speed of 3 km per hour or less) according to the quantity of its turning with the creep speed reference opening SLO as a criterion. Hereinafter, the turned quantity of the accelerator grip 48 with the creep speed reference opening SLO as the criterion is called a throttle minute opening THm which is distinguished from an absolute throttle opening TH.

When the accelerator grip 48 is turned up to the position in which the locking part 72 abuts on the creep speed limit stopper 73, the electric vehicle 1 is backed at a creep speed maximum value (for example, 3 km per hour). In the creep region αDZ, the motor 18 is driven so that the electric vehicle 1 is run with vehicle speed of approximately 1 km per hour, for example, as an objective vehicle speed.

In the meantime, when the accelerator grip 48 is turned from the creep speed reference opening SLO to a creep speed advancing region α2F on the rear side in the vehicle body through the creep region αDZ, the motor 18 is driven so that the electric vehicle 1 is advanced at creep speed (for example, at vehicle speed of 5 km per hour or less) according to its turned quantity with the creep speed reference opening SLO as the criterion. That is, when the accelerator grip 48 is returned up to a position in which the transition face 722 of the locking part 72 abuts on the transition face 642 of the stopper 64, the electric vehicle 1 is advanced at the creep speed maximum value (for example, 5 km per hour).

When the accelerator grip 48 is turned to the maximum position on the rear side in the vehicle body in the creep speed moving region α2, the locking part 72 and the stopper 64 abut on each other on the transition faces 722, 642 and the accelerator grip 48 is turned on the side of the normal moving region α1 from the position, the locking part 72 gets over the stopper 64 utilizing the inclination θ provided on the transition faces 722, 642 and can move to the normal moving region α1. To enable getting over the stopper 64, the throttle drum 54 is produced by resin the rigidity of which is small and which is flexible.

Figure 1:
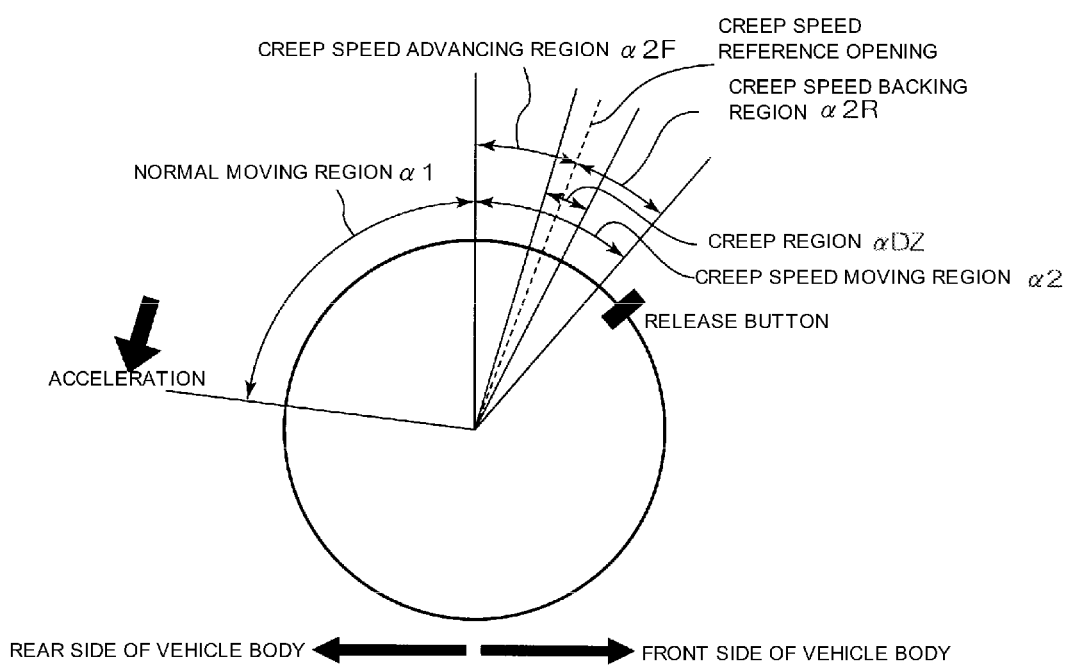
FIG. 1 shows relation between an angle at which an accelerator grip is operated and an operational mode in an electric vehicle in one embodiment of the present invention.

FIG. 1 shows relation between an operational angle of the accelerator grip provided on the right side of the steering handlebar 46 and an operational mode. As shown in FIG. 1, an operational range (hereinafter called the "normal moving region") α1 of the accelerator grip 48 for the steering handlebar 46 in a normal mode is provided. The normal moving region α1 is set, for example, to 87°. In the normal moving region α1, when the accelerator grip 48 is turned counter-clockwise (hereinafter called on the "rear side in the vehicle body") in FIG. 1, the electric vehicle 1 is accelerated and when the accelerator grip 48 is turned clockwise (hereinafter, called on the "front side in vehicle body") in FIG. 1, the electric vehicle 1 is decelerated.

The accelerator grip 48 can be further turned on the front side in the vehicle body from the most decelerated angular position of the normal moving region α1 and a range in which the accelerator grip 48 is operated in a creep speed mode (hereinafter called the "creep speed moving region") α2 is provided on the front side in the vehicle body of the normal moving region α1. The creep speed moving region α2 is set to a range of an angle 40° for example. Further, the creep speed moving region α2 includes a creep speed advancing region α2F which is an angular region on the rear side in the vehicle body and a creep speed backing region α2R which is an angular region on the front side in the vehicle body. Transition from the normal moving region α1 to the creep speed moving region α2 is enabled by pressing the release button 65 provided to the steering handlebar 46 and releasing a limit of the moving region.

The accelerator grip 48 is pressed by the throttle spring 57 to turn the accelerator grip 48 on the front side in the vehicle body, when the accelerator grip 48 is turned in an accelerated direction, that is, on the rear side in the vehicle body. As a result, the throttle spring 57 is twisted, and spring force is generated to recover twisted quantity according to the twisted quantity. Accordingly, when the accelerator grip 48 is released in an accelerator release position, the accelerator grip 48 is turned by the spring force up to a position regulated by the stopper 64 provided on the front side in the vehicle body. In other words, a position on the front side in the normal moving region α1 of the accelerator grip 48 is specified by the stopper.

When the release button 65 is operated and the regulation of the turning on the front side in the vehicle body of the accelerator grip 48 is released, the accelerator grip 48 is turned up to an intermediate position of the creep speed moving region α2 and the throttle spring 57 is balanced in a position (at the creep speed reference opening SLO) in which the twisted quantity of the throttle spring 57 is completely restored.

The rear side in the vehicle body from the creep speed reference opening SLO in the creep speed moving region α2 is equivalent to the creep speed advancing region α2F and the front side in the vehicle body from the creep speed reference opening SLO is equivalent to the creep speed backing region α2R. Besides, a predetermined creep angle or the creep region αDZ between the creep speed advancing region α2F and the creep speed backing region α2R, that is, across both the front side and the rear side respectively in the vehicle body with the creep speed reference opening SLO as the criterion, is provided. This configuration can avoid an unexpected or undesirable feeling that an advance and backing are abruptly switched.

It is desirable that a constant of the throttle spring is set so that the creep speed advancing region $\alpha 2F$ and the creep speed backing region $\alpha 2R$ have the substantially same angle (accordingly, for example, 20°). In the creep speed advancing region $\alpha 2F$, the motor 18 is rotated in a direction in which the electric vehicle 1 is advanced at predetermined minute vehicle speed according to the throttle opening TH and in the creep speed backing region $\alpha 2R$, the motor 18 is rotated in a direction in which the electric vehicle 1 is backed at the predetermined minute vehicle speed according to the throttle opening TH.

Figure 6:
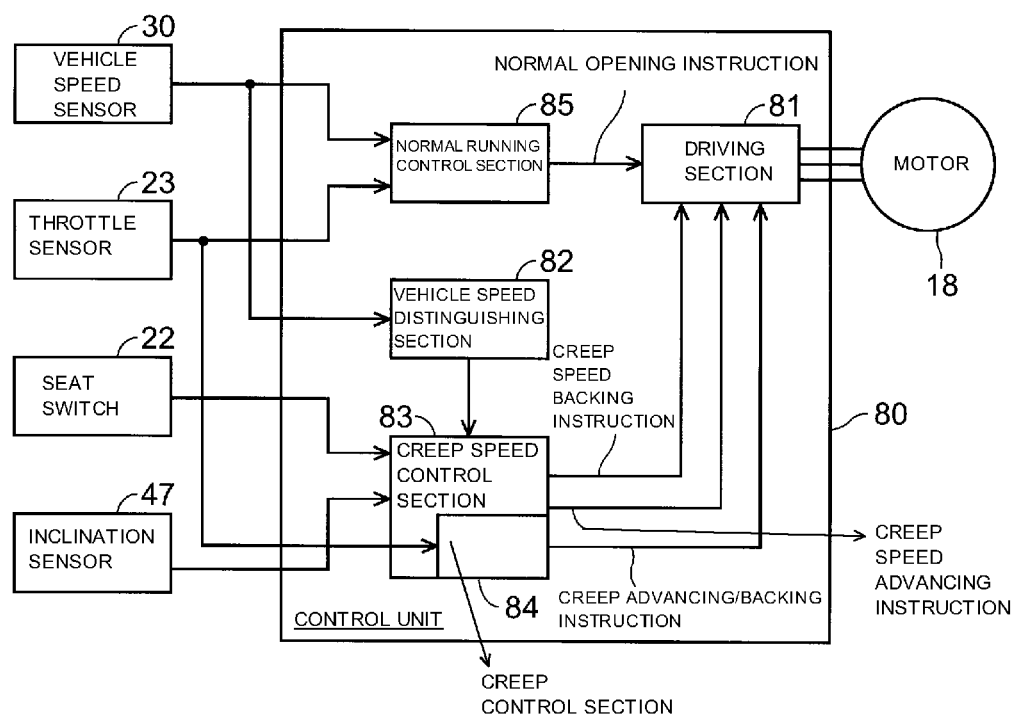
FIG. 6 is a block diagram showing the control system for a motor.

FIG. 6 is a block diagram showing a control system for the motor 18 by the operation of the accelerator grip 48. The control system includes the throttle sensor 23, the vehicle speed sensor 30, the seat switch 22, the inclination sensor 47 and a control unit 80 provided with a driving section 81 that drives the motor 18 to advance and back the electric vehicle 1 according to detection output by these sensors.

The control unit 80 is provided with a vehicle speed distinguishing section 82, a creep speed control section 83 and a normal running control section 85. The creep speed control section can include a creep control section 84. The vehicle speed distinguishing section 82 distinguishes whether or not the electric vehicle 1 is run based upon the detection output of the vehicle speed sensor 30. The creep speed control section 83 controls a creep speed advance and creep speed backing based upon the throttle opening TH when it is distinguished by the vehicle speed distinguishing section 82 that the electric vehicle 1 is not to run. The creep control section 84 controls so that the electric vehicle 1 is run at creep speed further smaller than creep advance speed and creep backing speed when the throttle opening TH is in the creep region $\alpha DZ$. The creep speed control section 83 outputs an instruction to advance at creep speed, an instruction to back at creep speed, a creep advance instruction and a creep backing instruction.

The normal running control section 85 is energized when vehicle speed is not zero and the throttle opening TH is not held at the creep speed reference opening SLO for predetermined time or longer and outputs a normal angle instruction according to the throttle opening TH. The driving section 81 drives the motor 18 according to each instruction when an instruction output from the creep speed control section 83 and the normal running control section 85 is input.

In a second embodiment, creep speed advance, creep speed backing, a creep advance and creep backing are controlled in consideration of the detection output of the seat switch 22 and the inclination sensor 47 in addition to the detection output of the throttle sensor 23 and the vehicle speed sensor 30. That is, the creep speed control section 83 can be energized when the electric vehicle 1 is not pushed down, vehicle speed is not zero and the seat switch 22 is not turned on. Besides, when vehicle speed is smaller than a specified vehicle speed set to a value at which a walk pushing or a walking speed movement of the electric vehicle is enabled, the creep speed control section 83 can be also energized.

Figure 7:
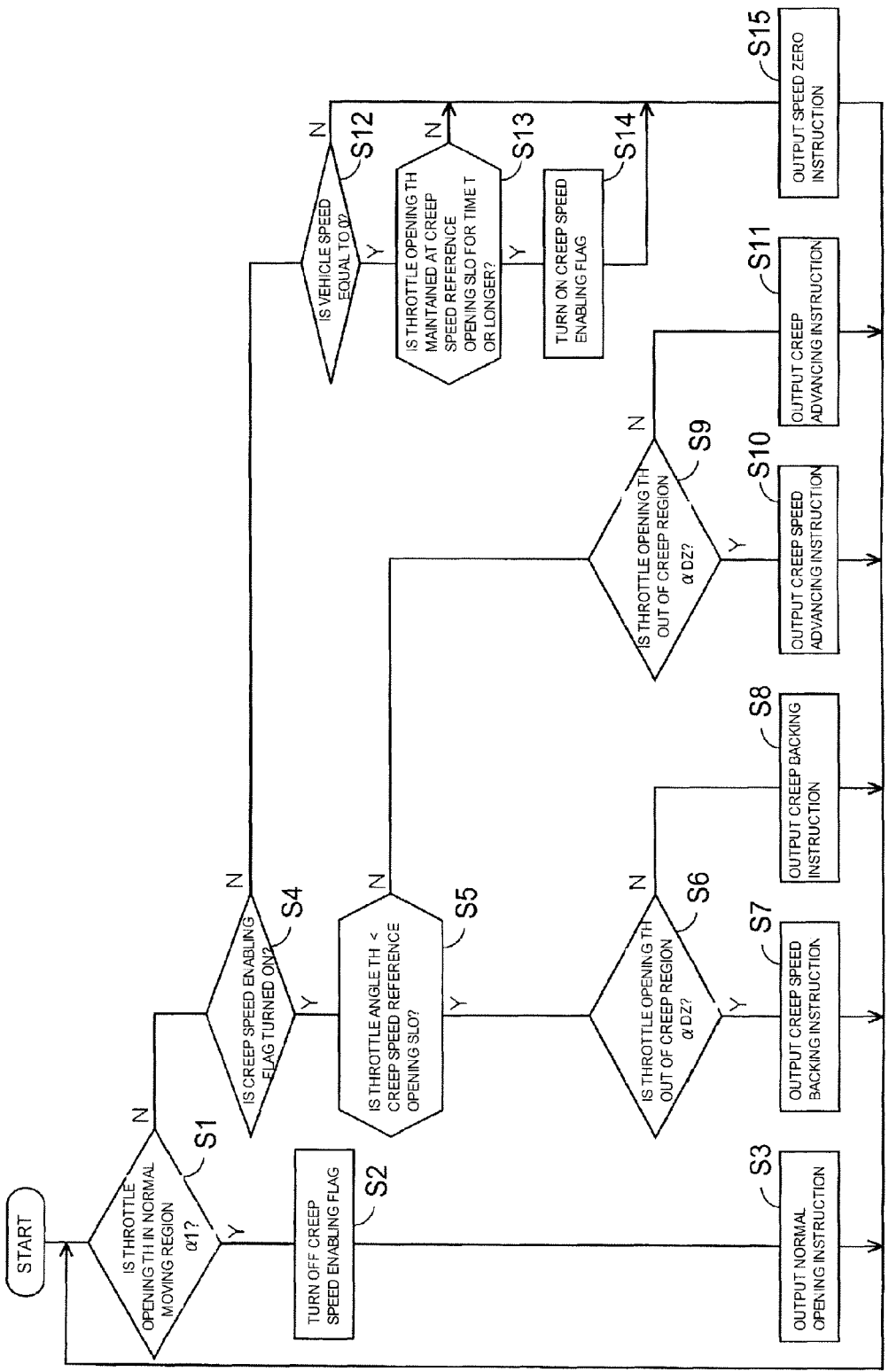
FIG. 7 is a flowchart showing the operation of the control system.

FIG. 7 is a flowchart showing the operation of the control system. In a step S1, it is determined whether a throttle opening TH is in the normal moving region $\alpha 1$ or not. In the following description, the throttle opening TH shall be all based upon the detection output of the throttle sensor 23. Accordingly, determination in the step S1 depends upon whether or not the detection output of the throttle sensor 23 is a detection signal equivalent to the normal moving region $\alpha 1$. When the throttle opening TH is in the normal moving region $\alpha 1$, a flow of processing proceeds to a step S2 and a creep speed enabling flag is turned off. In a step S3, a normal angle instruction according to the throttle opening TH is output to the driving section 81 of the motor 18.

When it is determined that the throttle opening TH is not in the normal moving region $\alpha 1$ in the step S1, the flow of processing proceeds to a step S4. It is determined whether or not the creep speed enabling flag turned on when the throttle opening is in the creep speed moving region $\alpha 2$ is turned on. When the creep speed enabling flag is turned on, the flow of processing proceeds to a step S5. It is determined whether the accelerator grip 48 is turned on the front side in the vehicle body of the creep speed reference opening SLO or not; in other words, whether or not the throttle opening TH is smaller than the creep speed reference opening SLO. In the case of Yes in the step S5 and further, in a step S6, it is determined whether or not the throttle opening TH is out of the creep region $\alpha DZ$ on the front side in the vehicle body. When the throttle opening TH is out of the creep region $\alpha DZ$, the flow of processing proceeds to a step S7 and a creep speed backing instruction according to the throttle opening TH is output to the driving section 81 of the motor 18. When the throttle opening TH is in the creep region $\alpha DZ$, a flow of processing in the step S6 proceeds to No, then, to a step S8, and a creep backing instruction is output to the driving section 81 of the motor 18.

When the throttle opening TH is not smaller than the creep speed reference opening SLO, a flow of processing in the step S5 proceeds to No, then, to a step 9 and it is determined whether or not a throttle opening TH is out of the creep region $\alpha DZ$ on the rear side in the vehicle body. In the case of Yes in the step S9, the flow of processing proceeds to a step S10 and a creep speed advance instruction according to the throttle opening TH is output to the driving section 81 of the motor 18. When the throttle opening TH is in the creep region $\alpha DZ$, a flow of processing in the step S9 proceeds to No, then to a step S11 and a creep advance instruction is output to the driving section 81 of the motor 18.

When the creep speed enabling flag is not turned on in the step S4, the flow of processing proceeds from the step S4 to a step S12 and it is determined whether or not vehicle speed is zero. This determination is made based upon the detection output of the vehicle speed sensor 30. When vehicle speed is zero, that is, when the electric vehicle 1 is not operated, the flow of processing proceeds to a step S13 and it is determined whether or not a throttle opening TH is maintained at the creep speed reference opening SLO for predetermined time T1 or longer, in other words, whether or not the accelerator grip 48 is not operated for the predetermined time T1 or longer or not. In the case of Yes (Y) in the step S13, that is, when the electric vehicle 1 is stopped and the accelerator grip 48 is also not turned, the flow of processing proceeds to a step S14 and the creep speed enabling flag is turned on. As the flow of processing proceeds to Y in the step S4 after the creep speed enabling flag is turned on, the minute rotation driving of the motor 18 according to the throttle opening TH in the creep speed moving region $\alpha 2$ is executed in the step S7 and in the step S10.

When the flow of processing proceeds to N in the step S12 or S13, that is, when the electric vehicle 1 is operated or a throttle opening TH is held at the creep speed reference opening SLO for the predetermined time T1 or longer, the flow of processing proceeds to a step S15 and an instruction to set vehicle speed to zero is output to the driving section 81 of the motor 18.

Figure 8:
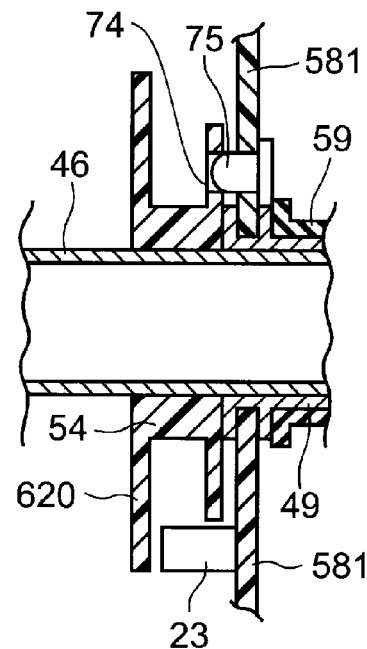
FIG. 8 is a sectional view showing a main part of a steering handlebar in a second embodiment.

Next, a second embodiment will be described. FIG. 8 is a sectional view showing a main part of a steering handlebar 46 in the second embodiment and the same reference sign is allocated to the same or the similar part as/to the part shown in FIG. 3. An accelerator grip 48 in the second embodiment is different from that shown in FIG. 3, and a locking part 72 and a stopper 64 that regulate a position of a throttle drum 54 and a moving region release device 66 including a release button 65 that releases this regulation, a stem 67 and others may not provided.

A recessed portion (may be also a hole) 74 is formed on the side opposite to an inside face of a right sidewall 581 of a switch case 58 of a flange 55 of the throttle drum 54 and a projecting portion (desirably a partially spherical projecting portion) 75 is formed in a position matched with the recessed portion 74 in a radial direction of the throttle drum 54 on the side of the right sidewall 581. Positions of the recessed portion 74 and the projecting portion 75 are determined so that they are mutually fitted when a throttle opening TH is at a creep speed reference opening or angle SLO. A rider can distinguish the switching of control by a click when the projecting portion 75 is fitted into the recessed portion 74 or is extracted from the recessed portion in a position in which an advance and backing are switched.

Figure 9:
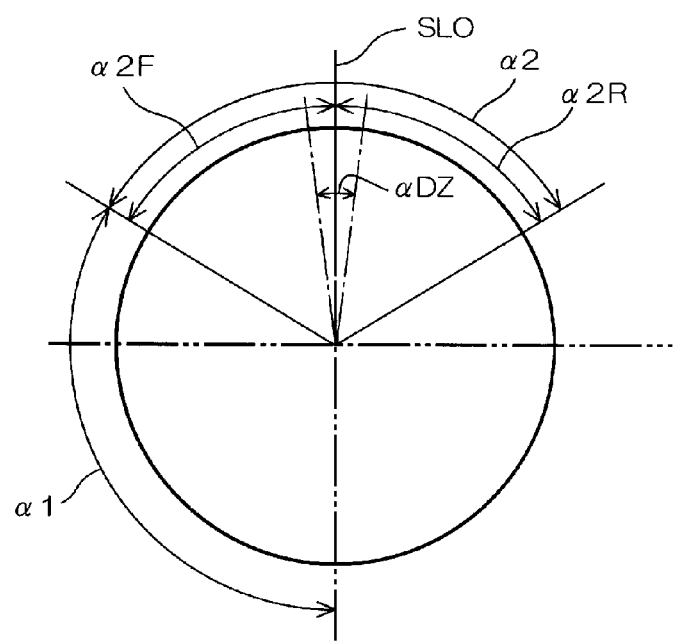
FIG. 9 shows relation between an angle at which an accelerator grip is operated and an operational mode in an electric vehicle in the second embodiment.

FIG. 9 is a schematic diagram showing relation between a position of the accelerator grip 48 and a running mode of an electric vehicle 1 in the second embodiment. As shown in FIG. 9, a normal moving region α1 and a creep speed moving region α2 according to a position of a throttle opening TH are provided, and a creep speed advancing region α2F and a creep speed backing region α2R are provided to the creep speed moving region α2. The creep speed reference opening SLO is provided at a boundary between the creep speed advancing region α2F and the creep speed backing region α2R. A creep region αDZ is provided on the front side and on the rear side of the creep speed reference opening SLO. In the creep region αDZ, a motor 18 is driven so that the electric vehicle 1 is run at speed lower than creep advance speed or creep backing speed.

Figure 10:
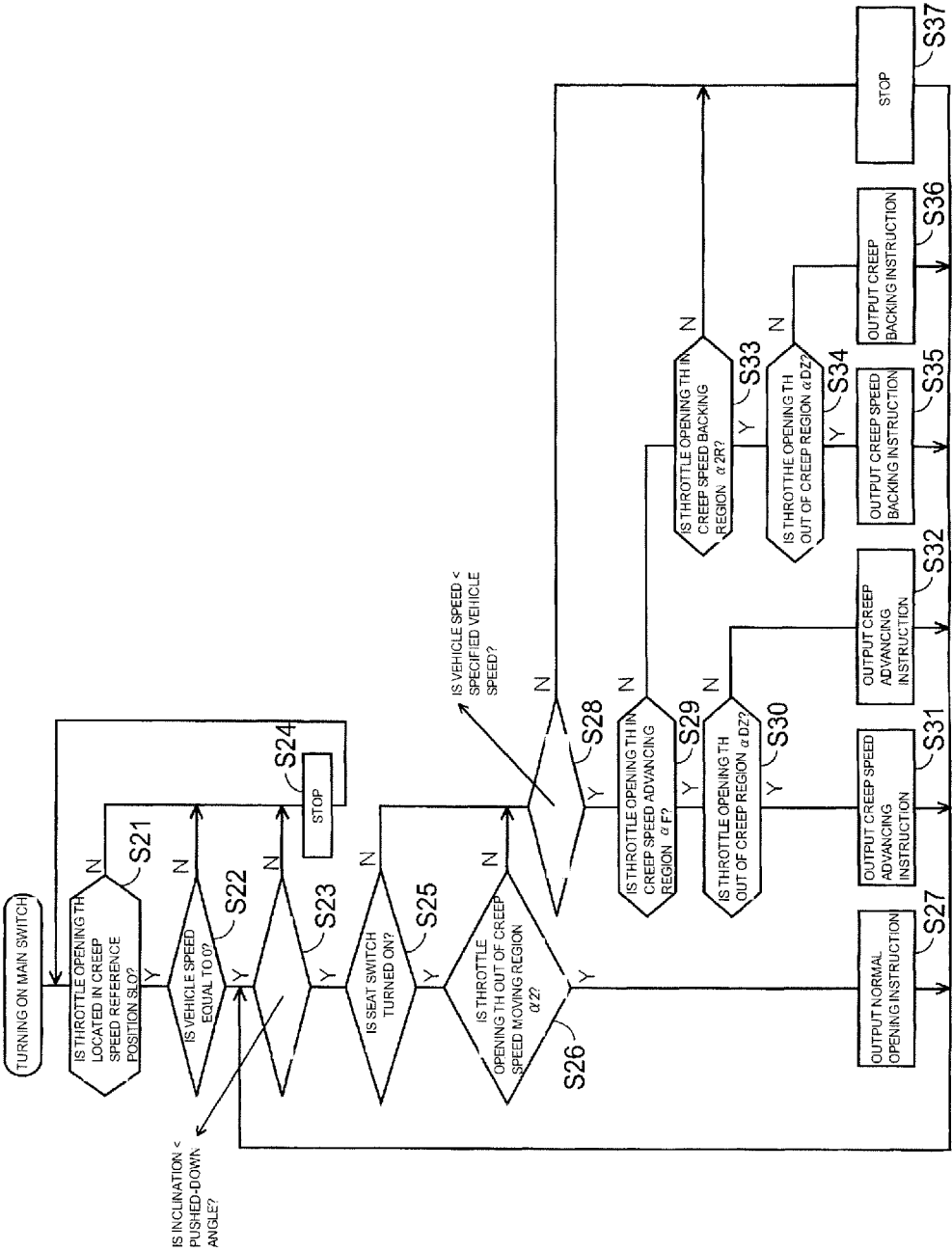
FIG. 10 is a flowchart showing the operation of a control system in the second embodiment.

FIG. 10 is a flowchart showing the operation of a control system in the second embodiment. In a step S21 shown in FIG. 10, it is determined whether a throttle opening TH is at the creep speed reference opening SLO or not. In the case of Yes in the step S21, a flow of processing proceeds to a step S22 and it is determined whether vehicle speed of the electric vehicle 1 is zero or not. In the step S21, determination for turning control an initial state is made. In the case of Yes in the step S22, the flow of processing proceeds to a step S23 and it is determined based upon the detection output of an inclination sensor 47 whether the electric vehicle 1 is inclined more than a predetermined inclination or not. In the case of No in any of the steps S21 to S23, an instruction to stop the motor 18 is output (a step S24).

In the case of Yes in the step S23, it is determined that a throttle opening TH shows a state of a stop, the electric vehicle 1 is not operated and is not pushed down and the flow of processing proceeds to a step S25. In the step S25, it is determined whether a seat switch 22 is turned on or not, that is, whether the rider is seated on a seat 21 or not. When the seat switch 22 is turned on, it is determined whether a throttle opening TH is out of the creep speed moving region α2 or not in a step S26. In the case of Yes (Y) in the step S26, it is determined that the throttle opening TH is in the normal moving region α1, the flow of processing proceeds to a step S27, and a normal angle instruction according to the throttle opening TH is output to a driving section 81 of the motor 18.

In the case of No in the step S25 or S26, that is, when the motor is rotated at creep speed (the electric vehicle 1 is driven at slow speed) with the rider seated or when the motor 18 is rotated at creep speed without the rider, the flow of processing proceeds to a step S28 and it is determined whether or not vehicle speed is equal to or lower than predetermined vehicle speed. The predetermined vehicle speed is set to vehicle speed of an extent that the speed exceeds a vehicle speed limit of a creep speed advance and creep speed backing and the rider can walk pushing the electric vehicle 1 forward. Vehicle speed at which the rider can walk pushing the electric vehicle forward is determined beforehand. The rider can walk while pushing the electric vehicle 1 forward at vehicle speed in a range in which walking while pushing the electric vehicle 1 is supposed.

When vehicle speed is equal to or lower than the predetermined vehicle speed, the flow of processing proceeds to a step S29 and it is determined whether or not a throttle opening TH is in the creep speed advancing region α2F. When the throttle opening TH is in the creep speed advancing region α2F, the flow of processing proceeds to a step S30 and it is determined whether or not the throttle opening TH is out of the creep region αDZ.

In the case of Yes in the step S30, the flow of processing proceeds to a step S31 and a creep speed advance instruction according to the throttle opening TH is output to the driver of the motor 18. In the case of No (N) in the step S30, the flow of processing proceeds to a step S32 and a creep advance instruction is output to the driving section 81 of the motor 18.

When it is determined in the step S29 that the throttle opening TH is not in the creep speed advancing region α2F, the flow of processing proceeds to a step S33 and it is determined whether or not the throttle opening TH is in the creep speed backing region α2R. When the throttle opening TH is in the creep speed backing region α2R, the flow of processing proceeds to a step S34 and it is determined whether or not a position of the accelerator grip 48 is out of the creep region αDZ. In the case of Yes in the step S34, the flow of processing proceeds to a step S35 and a creep speed backing instruction according to the throttle opening TH is output to the driving section 81 of the motor 18. In the case of No (N) in the step S34, the flow of processing proceeds to a step S36 and a creep backing instruction is output to the driving section of the motor 18.

When vehicle speed is equal to or higher than the predetermined vehicle speed or when a throttle opening TH is not in the creep speed advancing region α2F (a case of No in the step S29) and is not also in the creep speed backing region α2R (a case of No in the step S33), the flow of processing proceeds to a step S37 and an instruction to stop the motor 18 is output.

Next, a transformed example of the second embodiment will be described. FIG. 11 is a flowchart showing the operation of a control system in the transformed example. As steps S41, S42, S43, S44, S45, S46 and S47 are processed as in the steps S21, S22, S23, S24, S25, S26 and S27 shown in FIG. 10, the description is omitted.

In the case of No in the step S45, a flow of processing proceeds to a step S48. In the step S48, it is determined whether or not the vehicle speed of an electric vehicle 1 is zero. In the case of Yes in the step S48, the flow of processing proceeds to a step S49 and it is determined whether or not a throttle opening TH is at a creep speed reference opening SLO. In the case of Yes (Y) in the step S49, the flow of processing proceeds to a step S50. In the case of No in the steps S48 and S49, the flow of processing proceeds to the step S47.

In the step S50, it is determined based upon the detection output of an inclination sensor 47 whether or not the electric vehicle 1 is inclined more than a predetermined inclination. In the case of Yes in the step S50, the flow of processing proceeds to a step S51 and it is determined whether or not a seat switch 22 is turned off, that is, whether a rider is not seated on a seat 21 or not. When vehicle speed is zero (the case of Yes in the step S48), a throttle opening TH is at the creep speed reference opening SL0 (the case of Yes (Y) in the step S49), the electric vehicle 1 is not pushed down (the case of Yes in the step S50) and in addition, the rider is not seated on the seat (a case of Yes in the step S51), the processing of a creep speed advance and creep speed backing is executed in a step S52 and following steps. In the case of No in the steps S48 and S49, the flow of processing proceeds to the step S47 and in the case of No in the steps S50 and S51, the flow of processing proceeds to the step S44.

As the steps S52, S53, S54 and S55 are processed as in the steps S29, S30, S31 and S32 shown in FIG. 10, the steps S56, S57, S58 and S59 are processed as in the steps S33, S34, S35 and S36 shown in FIG. 10 and the step S60 is processed as in the step S37, detailed description every step is omitted.

In short, in this example, even if the seat switch 22 is turned off (the rider is not seated on the seat 21) while the electric vehicle 1 is in a running mode, the operation is not stopped when vehicle speed is zero, a creep speed advance or creep speed backing is enabled, and the rider can walk pushing the electric vehicle 1. In other words, only when respective outputs of a vehicle speed sensor 30, a throttle sensor 23, the inclination sensor 47 and the seat switch 22 meet a predetermined condition, a creep speed advance and creep speed backing by walking pushing the electric vehicle are enabled. In the meantime, when the rider is seated on the seat 21 and vehicle speed is not zero, normal operation according to a throttle opening TH is enabled.

In the processing shown in FIG. 11, determination in the step S28 shown in FIG. 10, that is, the determination of vehicle speed may be also added between the step S51 and the step S52.

The present invention is not limited to the above-mentioned embodiments and further transformation is allowed in a scope described in claims. For example, the electric vehicle 1 is not limited to the motorcycle and can be also applied to a saddle-ride type three-wheeled vehicle or four-wheeled vehicle. Besides, the throttle sensor is not limited to the non-contact type and may be also a contact type potentiometer that detects a turning angle of the accelerator grip.

REFERENCE SIGNS LIST

23 - - - Throttle sensor,
30 - - - Vehicle speed sensor,
46 - - - Steering handlebar,
48 - - - Accelerator grip,
54 - - - Throttle drum,
57 - - - Throttle spring,
58 - - - Switch case,
64 - - - Stopper,
65 - - - Release button,
72 - - - Locking part,
80 - - - Control unit,
81 - - - Driving section of motor,
82 - - - Vehicle speed distinguishing section,
83 - - - Creep speed control section,
84 - - - Creep control section,
85 - - - Normal running control section,
90 - - - Accelerator mechanism

The invention claimed is:

1. An electric vehicle, comprising:
an accelerator mechanism including an accelerator grip configured to enable operation of an accelerator for increasing a throttle opening in a first direction from a minimum opening in a normal moving region, and including a spring configured to restore the throttle opening on a side of the minimum opening when the accelerator grip is not operated;
a driving section configured to drive a motor according to the throttle opening by the accelerator mechanism;
a control device comprising
a creep speed moving region set in a second direction reverse to the first direction from the minimum opening,
a position regulating unit provided between the normal moving region and the creep speed moving region of the accelerator mechanism, and
a release unit configured to release regulation by the position regulating unit according to the operation of the accelerator when the throttle opening is varied across the position regulating unit by an operation of the accelerator grip,
wherein the accelerator mechanism is configured to operate the throttle opening from the minimum opening to the creep speed moving region further set in the second direction reverse to the first direction against the position regulating unit,
wherein the spring is configured to push the accelerator grip up to a creep speed reference opening located in a middle of the creep speed moving region so as to reduce the throttle opening,
wherein the control device further comprises a creep region configured to cross the creep speed reference opening,
wherein the creep speed control section includes a creep control section configured to control the electric vehicle to advance and back at creep speed lower than the predetermined minute vehicle speed when the throttle opening is in the creep region, and
wherein the control device further includes a creep speed control section configured to supply a motor driving instruction to the driving section to make the electric vehicle advance at a predetermined minute vehicle speed in a region in which the throttle opening is larger with the creep speed reference opening as a criterion in the creep speed moving region, and to make the electric vehicle back at the predetermined minute vehicle speed in a region in which the throttle opening is smaller with the creep speed reference opening as the criterion, in the creep speed moving region.

2. The electric vehicle according to claim 1, wherein the creep speed control section is configured to supply the motor driving instruction set to increase the vehicle speed of an advance and backing as a deviation of the throttle opening from the creep speed reference opening increases to the driving section.

3. The electric vehicle according to claim 1, further comprising:
a vehicle speed sensor,
wherein the creep speed control section is configured to control the electric vehicle to advance and back at the predetermined creep vehicle speed when the electric vehicle is stopped.

4. The electric vehicle according to claim 1, further comprising:
a timer,
wherein the creep speed control section is configured to control the electric vehicle to advance and back at the predetermined creep vehicle speed when the throttle opening is held at the creep speed reference opening for at least a predetermined time.

5. The electric vehicle according to claim 1,
wherein the position regulating unit comprises a stopper disposed on the side of the accelerator grip, and a locking part abutting the stopper in a direction in which the throttle opening is reduced; and wherein
the release unit includes a locking avoiding unit configured to move the stopper to avoid the abutment of the stopper on the locking part.

6. The electric vehicle according to claim 5, wherein mutual touched faces, when the accelerator grip is operated in a direction in which the throttle opening is increased out of outside faces of the stopper and the locking part, are inclined by (θ) to make them abut via a predetermined clearance angle.

7. The electric vehicle according to claim 1, further comprising:
a predetermined angle inclination sensor configured to detect lateral inclination from a state in which the electric vehicle is vertically disposed,
wherein the creep speed control section is configured to control the electric vehicle to advance and back at the predetermined creep vehicle speed when it is determined based upon the inclination that a fall of the electric vehicle is not detected.

8. The electric vehicle according to claim 1, further comprising:
a seat switch configured to output a detection signal when a rider is seated on a seat,
wherein the creep speed control section is configured to control the electric vehicle to advance and back at the predetermined creep vehicle speed when the rider is not seated on the seat.

9. The electric vehicle according to claim 1, wherein the creep speed control section is configured to control the electric vehicle to advance and back at creep vehicle speed lower than the speed of walking while pushing the electric vehicle, when speed at which a rider can walk while pushing the electric vehicle is a preset speed and vehicle speed is lower than the preset speed of walk pushing the electric vehicle.

10. The electric vehicle according to claim 1, wherein the creep speed control section is configured to supply a motor driving instruction to the driving section in order to stop the electric vehicle, when a speed at which the rider can walk while pushing the electric vehicle is a preset speed and vehicle speed is higher than the preset speed of walk pushing the electric vehicle.

11. The electric vehicle according to claim 1, wherein the electric vehicle comprises a saddle-ride type electric vehicle.

12. An electric vehicle, comprising:
accelerator means for controlling operation of an accelerator for increasing a throttle opening in a first direction from a minimum opening in a normal moving region, said accelerator means including accelerator grip means and spring means, said accelerator grip means for actuation by a rider to increase the throttle opening, and spring means for restoring the throttle opening on a side of the minimum opening when the accelerator grip is not operated;
driving means for driving a motor according to throttle opening by the accelerator means;
control means for controlling the driving means, the control means including a creep speed moving region set in a second direction reverse to the first direction from the minimum opening, the control means also including a position regulating means provided between the normal moving region and the creep speed moving region; and
release means for releasing regulation by the position regulating means according to the operation of the accelerator means when the throttle opening is varied across the position regulating means by an operation of the accelerator means,
wherein the accelerator means is also for operating the throttle opening from the minimum opening to the creep speed moving region further set in the second direction reverse to the first direction against the position regulating means, wherein the spring means is for pushing the accelerator grip up to a creep speed reference opening located in a middle of the creep speed moving region so as to reduce the throttle opening, and wherein the control means further includes creep speed control means for supplying a motor driving instruction to the driving means to make the electric vehicle advance at a predetermined minute vehicle speed in a region in which the throttle opening is larger with the creep speed reference opening as a criterion in the creep speed moving region, and to make the electric vehicle back at the predetermined minute vehicle speed in a region in which the throttle opening is smaller with the creep speed reference opening as the criterion, in the creep speed moving region, and
wherein he creep seed control means is also for living the motor driving instruction set to increase the vehicle speed of an advance and backing as a deviation of the throttle opening from the creep speed reference opening increases to the driving means.

13. The electric vehicle according to claim 12, wherein the control means includes a creep region for crossing the creep speed reference opening, wherein the creep speed control means includes a creep control means for controlling the electric vehicle to advance and back at a creep speed lower than the predetermined minute vehicle speed when the throttle opening is in the creep region.

14. The electric vehicle according to claim 12, further comprising vehicle speed sensor means for sensing a vehicle speed, wherein the creep speed control means is for controlling the electric vehicle to advance and back at the predetermined creep vehicle speed when the electric vehicle is stopped.

15. The electric vehicle according to claim 12, further comprising timer means for counting time, wherein the creep speed control means is for controlling the electric vehicle to advance and back at the predetermined creep vehicle speed when the throttle opening is held at the creep speed reference opening for at least a predetermined time as counted by the timer means.

16. The electric vehicle according to claim 12, wherein the position regulating means comprises a stopper disposed on the side of the accelerator grip means, and a locking part abutting the stopper in a direction in which the throttle opening is reduced, wherein the release means includes locking avoiding means for moving the stopper to avoid the abutment of the stopper on the locking part.

* * * * *